US012713148B2

(12) United States Patent
Kim et al.

(10) Patent No.: US 12,713,148 B2
(45) Date of Patent: Aug. 18, 2026

(54) IMAGE SENSOR AND OPERATING METHOD THEREOF

(71) Applicant: Samsung Electronics Co., Ltd., Suwon-si (KR)

(72) Inventors: Yongseong Kim, Suwon-si (KR); Jaeseong Yu, Suwon-si (KR); Taeshick Wang, Suwon-si (KR); Chanyoung Jang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 55 days.

(21) Appl. No.: 18/978,533

(22) Filed: Dec. 12, 2024

(65) Prior Publication Data

US 2025/0310660 A1 Oct. 2, 2025

(30) Foreign Application Priority Data

Mar. 27, 2024 (KR) ........................ 10-2024-0042006

(51) Int. Cl.
*H04N 25/62* (2023.01)

(52) U.S. Cl.
CPC .................................. *H04N 25/62* (2023.01)

(58) Field of Classification Search
CPC ......... H04N 25/62; H04N 25/61; H04N 25/40
USPC .......................................................... 348/241
See application file for complete search history.

(56) References Cited

U.S. PATENT DOCUMENTS 7,889,271 B2 * 2/2011 Takahashi ............... H10F 30/24 369/100
9,503,616 B2 * 11/2016 Taniguchi ............ H04N 25/134
2001/0037160 A1 11/2001 Kumata
2013/0259360 A1 * 10/2013 Bingrong .................. G06T 7/55 382/154
2016/0073006 A1 * 3/2016 Funamoto .............. G06V 20/52 348/345

(Continued)

FOREIGN PATENT DOCUMENTS

KR 10-2001-0095057 A 11/2001
KR 10-2002-0014535 A 2/2002
KR 10-1470001 B1 12/2014

(Continued)

*Primary Examiner* — Usman A Khan
(74) *Attorney, Agent, or Firm* — Fish & Richardson P.C.

(57) ABSTRACT

Provided are an image sensor and an operating method thereof. The image sensor includes an image generating device including a plurality of pixels, configured to generate a pixel signals, and configured to generate first image data including pixel information based on the pixel signals, a channel deviation determination processor configured to receive the first image data and determine whether the first image data is channel deviation image data includes a channel deviation based on the pixel information, a channel deviation region determination processor configured to calculate a determination parameter based on the pixel information, based on the first image data being the channel deviation image data, and determine channel deviation regions within the first image data based on the calculated determination parameter, and a pre-processor configured to generate second image data by correcting the channel deviation regions based on the determination parameter, the pixel information including pixel codes of pixels.

20 Claims, 14 Drawing Sheets

(56) References Cited

U.S. PATENT DOCUMENTS

| | | | | |
|---|---|---|---|---|
| 2017/0064263 | A1* | 3/2017 | Lee ...................... | H04N 23/951 |
| 2018/0091719 | A1 | 3/2018 | Wakisaka | |

FOREIGN PATENT DOCUMENTS

| | | | |
|---|---|---|---|
| KR | 10-2514200 | B1 | 3/2023 |
| KR | 10-2584573 | B1 | 10/2023 |
| KR | 10-2023-0174127 | A | 12/2023 |

* cited by examiner 1
20
AP
10
Image Sensor
100
IMAGE GENERATING DEVICE
ID1
200
CHANNEL DEVIATION DETERMINATION PROCESSOR
300
CHANNEL DEVIATION REGION DETERMINATION PROCESSOR
400
Pre-Processor
ID2
LS
Object

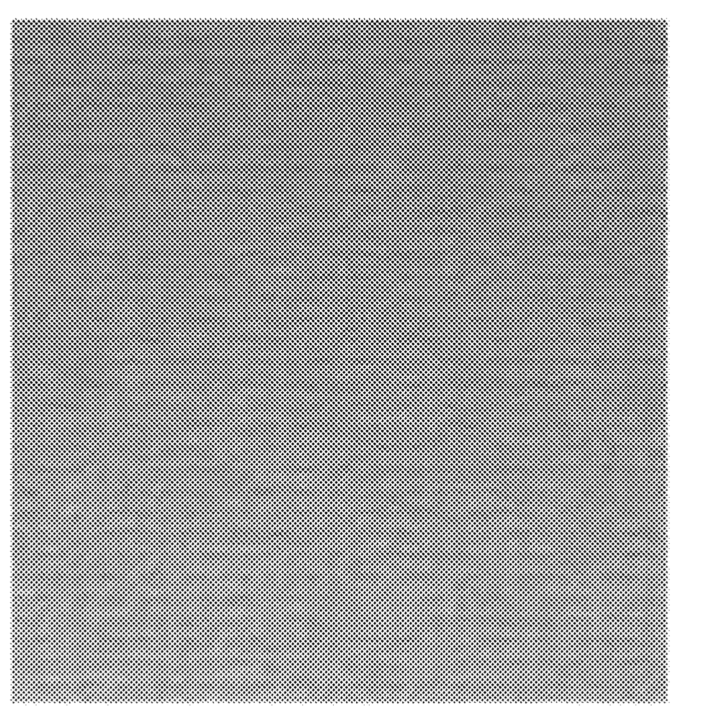
a2
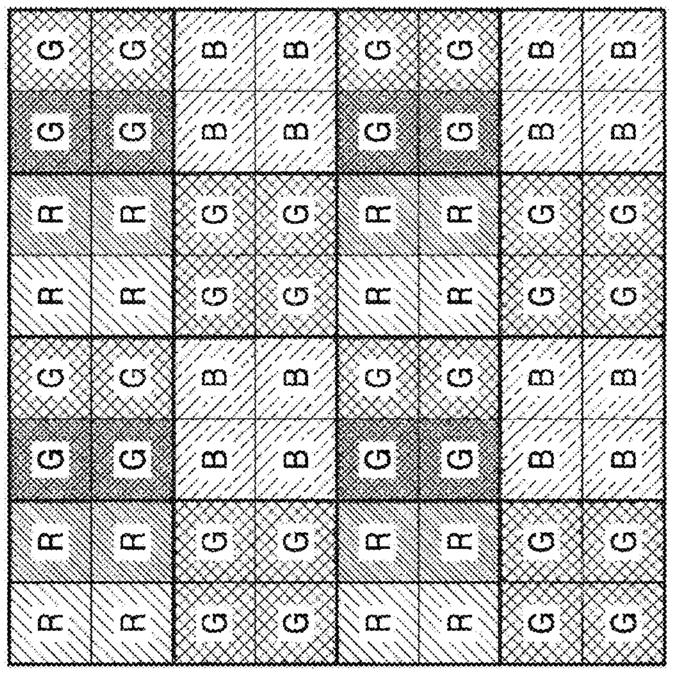
a1

| 90 | 70 | 70 | 90 | 90 | 70 | 70 | 90 |
|---|---|---|---|---|---|---|---| a3

| R | R | G | G | R | R | G | G |
|---|---|---|---|---|---|---|---|
| R | R | G | G | R | R | G | G |
| G | G | B | B | G | G | B | B |
| G | G | B | B | G | G | B | B |
| R | R | G | G | R | R | G | G |
| R | R | G | G | R | R | G | G |
| G | G | B | B | G | G | B | B |
| G | G | B | B | G | G | B | B |

IMAGE SENSOR AND OPERATING METHOD THEREOF

CROSS-REFERENCE TO RELATED APPLICATION

This application is based on and claims priority under 35 USC § 119 to Korean Patent Application No. 10-2024-0042006, filed on Mar. 27, 2024, in the Korean Intellectual Property Office, the disclosure of which is incorporated by reference herein in its entirety.

BACKGROUND

The inventive concepts relate to image sensors, and more particularly, to image sensors that perform crosstalk correction operations to improve the quality of image data and operating methods thereof.

Image sensors capture a two-dimensional or three-dimensional images of objects. Image sensors create an image of an object by using a photoelectric conversion element that reacts according to the intensity of light reflected from the object. Recently, with the advancement of complementary metal-oxide semiconductor (CMOS) technology, CMOS image sensors using CMOS have been widely used.

As the pixel structures of image sensors diversify and the size of pixels decreases, when a subject is imaged in a backlit environment, incident light may be detected unevenly across pixels, or crosstalk, in which detection results are leaked between pixels, may occur. In other words, noise and distortion may occur in images generated by image sensors, so an image sensor and an operating method of the image sensor are required to correct crosstalk.

SUMMARY

The inventive concepts provide image sensors capable of determining whether image data has a channel deviation, determining a channel deviation region in the image data having the channel deviation, and performing a correction operation on the determined channel deviation region, and an operating method of the image sensor.

According to some aspects of the inventive concepts, there is provided an image sensor including an image generating device including a plurality of pixels configured to generate a plurality of pixel signals, the image generating device configured to generate first image data including pixel information based on the plurality of pixel signals, a channel deviation determination processor configured to receive the first image data and determine whether the first image data is channel deviation image data in which a channel deviation occurs based on the pixel information, a channel deviation region determination processor configured to calculate a determination parameter based on the pixel information, in response to the first image data being determined to be the channel deviation image data, and determine at least one channel deviation region within the first image data based on the calculated determination parameter, and a pre-processor configured to generate second image data by correcting the at least one channel deviation region of the first image data based on the determination parameter, the pixel information including pixel codes of the plurality of pixels.

According to some aspects of the inventive concepts, there is provided an image sensor including an image generating device including a plurality of pixels configured to generate a plurality of pixel signals, and the image generating device configured to generate first image data, the first image data including pixel codes of the plurality of pixels, based on the plurality of pixel signals, a channel deviation determination processor configured to receive the first image data, to determine whether the first image data is channel deviation image data in which a channel deviation occurs, to calculate, in response to the first image data being channel deviation image data, a determination parameter based on the pixel codes, and determine at least one channel deviation region within the first image data based on the calculated determination parameter, and a pre-processor configured to generate second image data by correcting the at least one channel deviation region of the first image data based on the determination parameter, the channel deviation determination processor configured to calculate a saturation ratio of the first image data based on the pixel codes and to determine the first image data to be channel deviation image data, based on the saturation ratio being greater than or equal to a threshold ratio.

According to some aspects of the inventive concepts, there is provided an operating method of an image sensor including a plurality of pixels, including generating first image data including pixel information based on a plurality of pixel signals generated by the plurality of pixels, determining whether the first image data is channel deviation image data in which a channel deviation occurs based on the pixel information, based on the pixel information, calculating a determination parameter based on the pixel information, in response to the first image data being the channel deviation image data, determining at least one channel deviation region within the first image data based on the determination parameter, and generating second image data by correcting the at least one channel deviation region based on the determination parameter, the pixel information including pixel codes of the plurality of pixels.

BRIEF DESCRIPTION OF THE DRAWINGS

Embodiments will be more clearly understood from the following detailed description taken in conjunction with the accompanying drawings in which:

In order to more fully understand the drawings cited in the detailed description of the inventive concepts, a brief description of each drawing is provided.

FIGS. 2A to 2C are diagrams illustrating crosstalk that occurs in a backlit environment;

FIG. 6 is a diagram illustrating an operation of determining whether image data has a channel deviation in an operating method of an image sensor according to some example embodiments;

FIG. 7 is a diagram illustrating an operation of determining a channel deviation region in an operating method of an image sensor according to some example embodiments;

FIG. 9 is a diagram illustrating an operation of determining a channel deviation region in an operating method of an image sensor according to some example embodiments;

DETAILED DESCRIPTION

Hereinafter, embodiments are described in detail with reference to the accompanying drawings.

Figure 1:
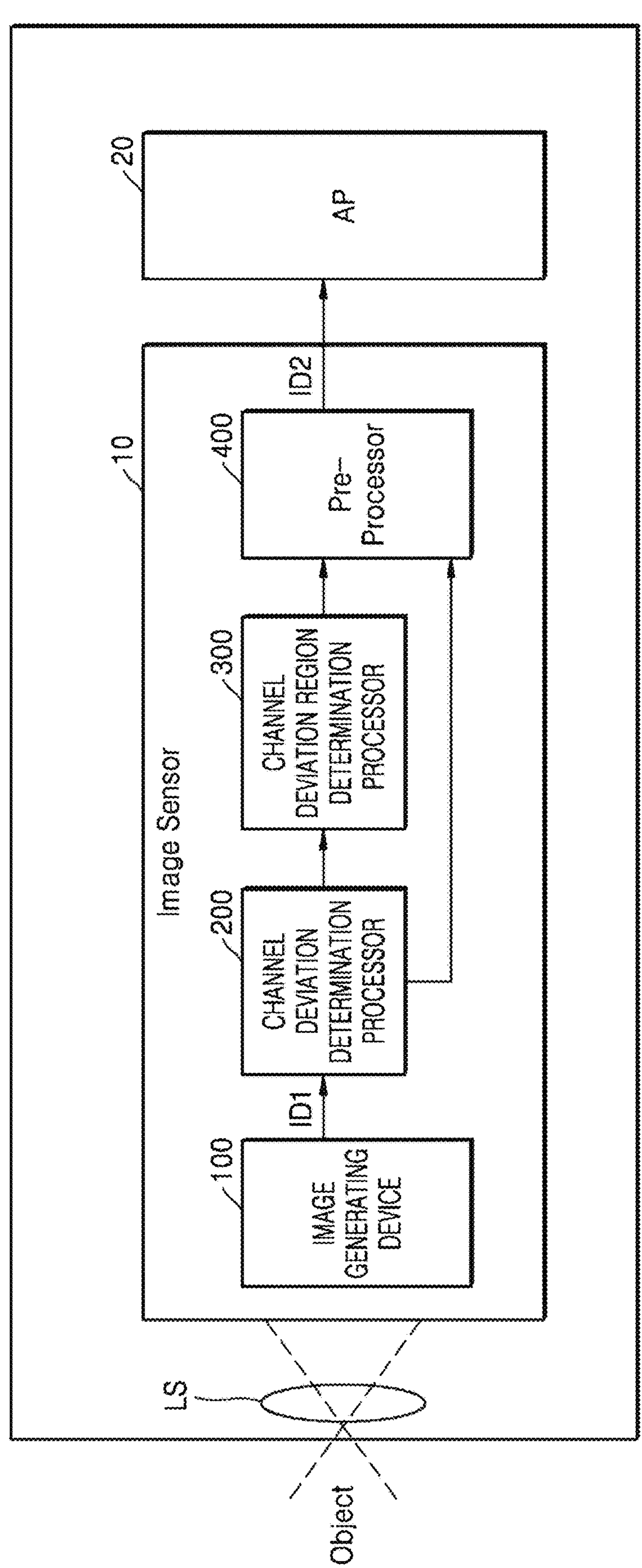
FIG. 1 is a block diagram illustrating an image processing device including an image sensor according to some example embodiments.
Figure 2A:
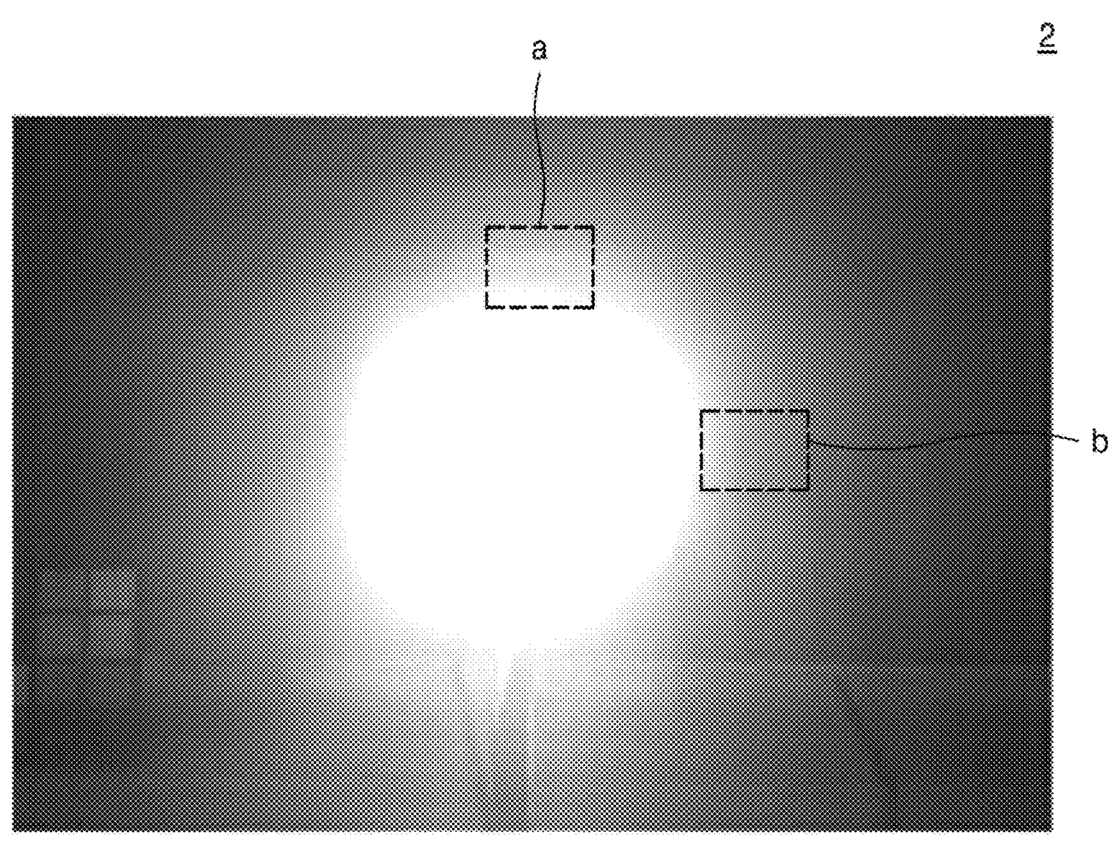
Figure 2A:
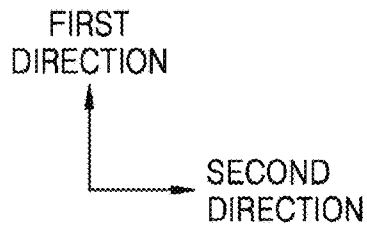
Figure 2C:
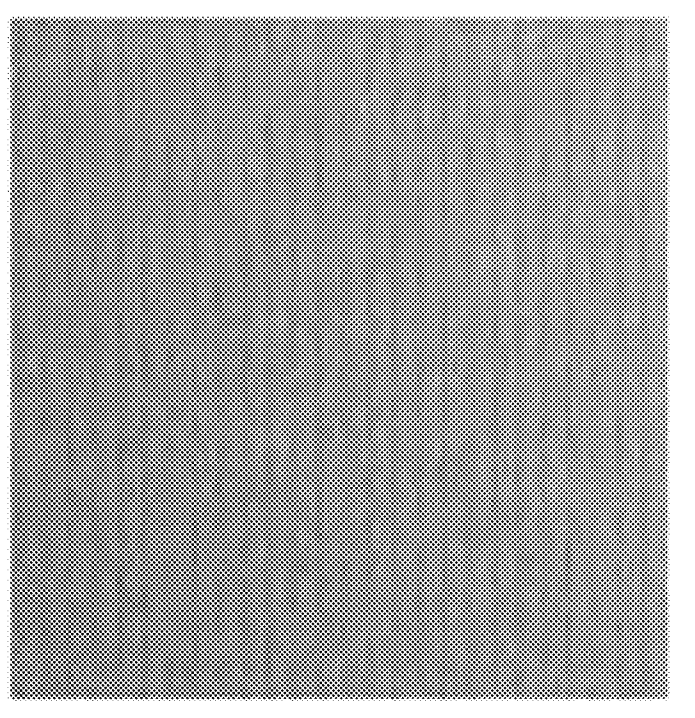
Figure 2C:
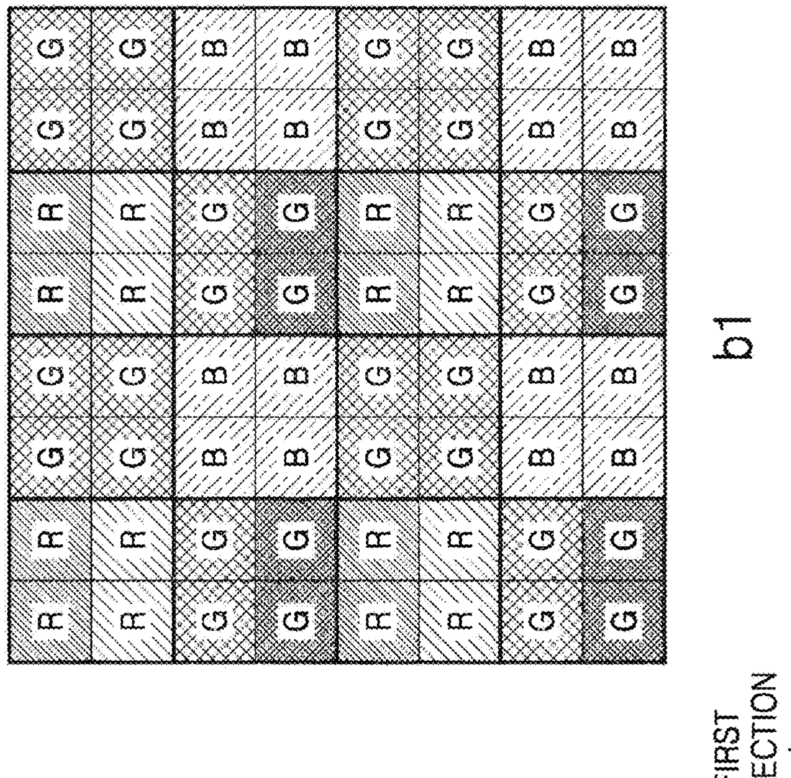

FIG. 1 is a block diagram illustrating an image processing device 1 including an image sensor according to some example embodiments. FIGS. 2A to 2C are diagrams illustrating crosstalk that occurs in a backlight environment.

Referring to FIG. 1, the image processing device 1 may be embedded in or implemented as an electronic device. Electronic devices are devices that capture images, display captured images, or perform an operation based on the captured images, may include electronic devices, such as digital cameras, smartphones, wearable devices, the Internet of things (IoT) devices, personal computers (PCs), tablet PCs, personal digital assistants (PDAs), portable multimedia players (PMPs), navigation devices, drones, etc. or may be mounted in electronic devices provided as components in vehicles, medical devices, furniture, manufacturing equipment, security devices, doors, various measurement devices, etc.

The image processing device 1 may include an image sensor 10 and an application processor (AP) 20. The image processing device 1 may further include other components, such as a memory (not shown), a display (not shown), and a user interface (not shown).

The image sensor 10 may include an image generating device 100, a channel deviation determination processor 200, a channel deviation region determination processor 300, and a pre-processor 400.

The image generating device 100 may include a plurality of pixels and convert an optical signal of an object incident through an optical lens LS into an electrical signal generated by the pixels. The image generating device 100 may generate first image data ID1, which is image data, based on the electrical signal (e.g., a pixel signal).

In some example embodiments, the first image data ID1 may include pixel information. The pixel information may refer to information related to a plurality of pixels corresponding to the first image data ID1. For example, the pixel information may include pixel codes of the pixels. A pixel code may refer to a code generated based on the electrical signal generated by a pixel and may have various ranges depending on the image sensor 10. For example, the pixel code value may have a value from 0 to 1000, 0 may be a pixel code value generated based on an electrical signal for the darkest light, and 1000 may be a pixel code value generated based on an electrical signal for the brightest light.

For example, the pixel information may include channel information, which is color information of a plurality of pixels. The channel information may refer to information indicating whether each of the pixels is a red pixel for converting light in a red spectral range into an electrical signal, a green pixel for converting light in a green spectral range into an electrical signal, or a blue pixel for converting light in a blue spectral region into an electrical signal. Herein, the spectral region may refer to a range of wavelengths of light, for example referring to wavelengths of light corresponding to, for example, blue in the visible spectrum, or infrared outside of the visible spectrum, etc. However, without being limited thereto, the channel information may further include whether each pixel is a white pixel. As another example, the channel information may include information indicating whether each pixel is pixels including a combination of different colors, for example, a yellow pixel, a cyan pixel, or a green pixel.

In some example embodiments, a plurality of pixels may be configured in a certain pattern, and the image generating device 100 may generate the first image data ID1 corresponding to the certain pattern. For example, the certain pattern may be a tetra pattern including red pixels R arranged in a 2×2 matrix, blue pixels B arranged in a 2×2 matrix, and green pixels G arranged in a 2×2 matrix. For example, the certain pattern may be a nona pattern including red pixels R arranged in a 3×3 matrix, blue pixels B arranged in a 3×3 matrix, and green pixels G arranged in a 3×3 matrix. For example, the certain pattern may be a tetra square (tetra^2) pattern including red pixels R arranged in a 4×4 matrix, blue pixels B arranged in a 4×4 matrix, and green pixels G arranged in a 4×4 matrix. For example, the certain pattern may be a Q-cell pattern including red pixels R arranged in a 2×2 matrix and sharing one lens, blue pixels B arranged in a 2×2 matrix and sharing one lens, and green pixels G arranged in a 2×2 matrix and sharing one lens. However, without being limited thereto, the certain pattern may include various other patterns.

In a backlight environment in which the pixels of the image generating device 100 are configured in a certain pattern and relatively strong light, such as sunlight, enters the lens LS or relatively strong light enters the lens LS from a light source outside a field of view of the image generating device 100, channel deviation may occur in the first image data ID1. Channel deviation may occur as pixels codes corresponding to pixels for converting light of the same spectral range in the first image data ID1 into an electrical signal have different values due to a difference in sensitivity (or transmittance) of the pixels included in the image generating device 100 depending on the location and type of a light source.

For example, referring further to FIG. 2A, a first image 2 may include a centrally located white light source, and a first region a may indicate a channel deviation region in which relatively strong light from the light source is incident in a second direction and a second region b may indicate a channel deviation region in which relatively strong light is incident from the light source in a first direction. The channel deviation region may refer to a region in which a channel deviation occurs within image data.

Referring further to FIG. 2B, the pixels of the image generating device 100 may be configured in a tetra pattern, and a first figure a1 shows pixels in 8×8 matrix corresponding to the first region a of FIG. 2A, among the pixels of the image generating device 100. In the case of white light, the sensitivity of the green pixel G may be higher than that of the red pixel R, and there may be no difference between the sensitivity of the green pixel G and the sensitivity of the blue pixel B. Accordingly, the red pixel R adjacent to the red pixel R in the second direction may be more affected by the light source than the red pixel R adjacent to the green pixel G in the second direction to have a relatively high pixel code value, and the green pixel G adjacent to the red pixel R in the second direction may be more affected by the light source than the green pixel G adjacent to the green pixel G in the second direction to have a relatively high pixel code value.

In other words, the pixel codes of pixels of the same color arranged in the 2×2 matrix may be different from each other, and crosstalk may occur in which incident light is detected unevenly across the pixels or a detection result leaks between pixels. A second figure a2 is image data representing a first region a of the first image data ID1 when the generated crosstalk is not corrected.

Referring further to FIG. 2C, the pixels of the image generating device 100 may be configured in a tetra pattern, and a third figure b1 shows pixels in an 8×8 matrix corresponding to a second region b of FIG. 2A, among the pixels of the image generating device 100. Similar to FIG. 2B, pixel codes of pixels of the same color arranged in a 2×2 matrix may be different from each other in the first direction, and crosstalk may occur. A fourth figure b2 is image data representing a second region b of the first image data ID1 when the generated crosstalk is not corrected.

If the generated crosstalk is not corrected, noise that was not present in a subject (e.g., the vertical lines in the second figure a2 or the horizontal lines in the fourth figure b2) may occur and image quality may deteriorate. To improve image quality, referring back to FIG. 1, the image sensor 10 may determine whether the image data has a channel deviation, and in the case of image data with a channel deviation, at least one channel deviation region in the image data may be determined, and the at least one determined channel deviation region may be corrected to generate corrected image data.

In detail, the channel deviation determination processor 200 may determine whether the first image data ID1 is image data in which a channel deviation occurs based on pixel information including pixel codes of the pixels of the image generating device 100.

In some example embodiments, the channel deviation determination processor 200 may calculate a saturation ratio of the first image data ID1 based on the pixel codes and determine whether the first image data ID1 is image data in which a channel deviation occurs based on the saturation ratio.

In some example embodiments, the channel deviation determination processor 200 may count the number of pixel codes having a pixel code value greater than or equal to a value of a threshold pixel code among the pixel codes of the first image data ID1 and may count, as a saturation ratio, the ratio of the counted number of pixel codes for the total number of pixel codes. The threshold pixel code may be a pixel code arbitrarily set by a user of the image processing device 1 or may be a preset (or, alternatively, desired or generated) pixel code. If the saturation ratio is greater than or equal to a threshold ratio, the channel deviation determination processor 200 may determine the first image data ID1 as image data in which a channel deviation occurs. The threshold ratio may be a ratio arbitrarily set by the user of the image processing device 1 or may be a preset (or, alternatively, desired or generated) ratio.

For example, when the threshold ratio is about or exactly 40 percent (%), if the ratio of the counted number of pixel codes to the total number of pixel codes is about or exactly 40% or more, the channel deviation determination processor 200 may determine the first image data ID1 as image data in which a channel deviation occurs, and if the ratio of the counted number of pixel codes to the total number of pixel codes is less than about or exactly 40%, the channel deviation determination processor 200 may determine the first image data ID1 not as image data in which a channel deviation occurs.

In some example embodiments, the channel deviation determination processor 200 may divide the first image data ID1 into a plurality of regions, calculate an average value of pixel codes included in each of the regions, and count the number of regions having a value equal to or greater than the threshold pixel code, among the calculated average values, thereby calculating the saturation ratio of the first image data ID1. Some example embodiments in which the channel deviation determination processor 200 calculates the saturation ratio based on the regions is described below with reference to FIG. 6.

In some example embodiments, when the channel deviation determination processor 200 determines the first image data ID1 as image data in which a channel deviation occurs, the channel deviation determination processor 200 may transmit the first image data ID1 to the channel deviation region determination processor 300, and when the channel deviation determination processor 200 determines the first image data ID1 not as image data in which a channel deviation occurs, the channel deviation determination processor 200 may transmit the first image data ID1 to the pre-processor 400. For example, the channel deviation determination processor 200 may determine the first image 2 of FIG. 2A as image data in which a channel deviation occurs based on pixel information, and transmit the first image 2 to the channel deviation region determination processor 300.

The image sensor 10 determines whether the first image data ID1 is image data with a channel deviation without interworking with an external device (e.g., the AP 20), and thus, the image sensor 10 may perform a crosstalk correction operation relatively rapidly, compared to a case in which whether the first image data ID1 is image data with a channel deviation is determined by interworking with an external device.

When receiving the first image data ID1 from the channel deviation determination processor 200, the channel deviation region determination processor 300 may calculate a determination parameter based on the pixel information and determine at least one channel deviation region within the first image data ID1 based on the calculated determination parameter. The determination parameter may refer to various parameters for determining whether a certain portion in the image data is a channel deviation region.

In some example embodiments, the determination parameter may include at least one of power per pixel frequency corresponding to each of the pixels of the image generating device 100, the sum of absolute difference (SAD) corresponding to each of the pixels, or brightness corresponding to each of the pixels. For example, the channel deviation region determination processor 300 may calculate at least one of the power per pixel frequency corresponding to each of the pixels of the image generating device 100, the SAD corresponding to each of the pixels, or the brightness corresponding to each of the pixels based on the pixel codes of the first image data ID1 and determine at least one channel deviation region within the first image data ID1 based on the calculated determination parameter.

In some example embodiments, the channel deviation region determination processor 300 may calculate at least one of the power per pixel frequency corresponding to each of the pixels of the image generating device 100, the SAD corresponding to each of the pixels, or the brightness corresponding to each of the pixels based on the pixel codes of the first image data ID1 and determine at least one channel deviation region within the first image data ID1 based on the power per pixel frequency, the SAD, and the brightness.

For example, the channel difference region determination processor 300 may determine, as a channel deviation region, a region corresponding to pixels having a pixel frequency power equal to or greater than a threshold power, an SAD equal to or greater than a threshold SAD, and a brightness equal to or greater than a lower threshold limit value and equal or less than an upper threshold limit value. Some example embodiments in which the channel deviation region determination processor 300 determines at least one channel deviation region is described below with reference to FIGS. 7 to 9. For example, the channel deviation region determination processor 300 may determine, as the channel deviation region, the first region a and the second region b within the first image 2 of FIG. 2A based on the determination parameter.

The pre-processor 400 may perform noise reduction processing, gain adjustment, waveform normalization processing, interpolation processing, white balance processing, gamma processing, edge emphasis processing, binning, etc. on image data. Noise reduction processing may include crosstalk correction.

In some example embodiments, the pre-processor 400 may receive first image data ID1 in which no channel deviation occurs from the channel deviation determination processor 200 and perform noise reduction processing, gain adjustment, waveform normalization processing, interpolation processing, white balance processing, gamma processing, edge emphasis processing, binning, etc. on the first image data ID1 to generate second image data ID2.

In some example embodiments, the pre-processor 400 may receive the first image data ID1 including at least one channel deviation region and a determination parameter from the channel deviation region determination processor 300 and perform correction on the at least one channel deviation region within the first image data ID1 to generate the second image data ID2.

For example, the pre-processor 400 may perform a correction operation to compensate for power per pixel frequency corresponding to a plurality of pixels included in the channel deviation region (e.g., the first region a or the second region b of FIG. 2A) in the channel deviation region to generate second image data ID2 with the corrected channel deviation region.

In some example embodiments, the pre-processor 400 may correct only a certain channel within at least one channel deviation region based on channel information to generate the second image data ID2. For example, referring further to FIG. 2B, in the red pixels R arranged in the 2×2 matrix and the green pixels G arranged in the second direction with the red pixels R and arranged in the 2×2 matrix, pixel codes of the pixels of the same color may be different from each other, while, in the blue pixels B arranged in the 2×2 matrix and the green pixels G arranged in the second direction with the blue pixels B and arranged in the 2×2 matrix, pixel codes of the pixels of the same color may be the same. Accordingly, the pre-processor 400 may perform a correction operation to compensate for power per pixel frequency only for pixels codes corresponding to the red pixels R arranged in the 2×2 matrix and the green pixels G arranged in the second direction with the red pixels R and arranged in the 2×2 matrix. Similarly, in the second region b of FIG. 2A, the pre-processor 400 may perform a correction operation to compensate for power per pixel frequency only for pixel codes corresponding to the red pixels R arranged in the 2×2 matrix and the green pixels G arranged in the first direction with the red pixels R and arranged in the 2×2 matrix, thereby generating the second image data ID2 in which the channel deviation regions (e.g., the first region a and the second region b of FIG. 2A) is corrected.

Unlike the second figure a2 of FIG. 2B and the third figure b2 of FIG. 2C, noise (e.g., the vertical lines or the horizontal lines) which was not present in the subject may be removed from the corrected second image data ID2, and thus, the image sensor 10 may improve quality of the image data. In addition, the image sensor 10 determines the channel deviation region in the image data in which a channel deviation occurs and performs correction on the channel deviation region, so compared to performing correction on the entire image data in which a channel deviation occurs, resolution loss for the image data may be reduced, thereby improving quality of the image data.

The AP 20 may receive the second image data ID2 from the image sensor 10 and perform various processing on the received second image data ID2. For example, the AP 20 may perform processing to improve image quality, such as removing noise, adjusting brightness, and adjusting sharpness of the second image data ID2, processing, such as changing an image size, changing a data format, etc. and be implemented as a system-on-chip (SoC) controlling the overall operation of the image processing device 1 and running an application program, an operating system, etc.

For example, according to some example embodiments, there may be an increase in speed, accuracy, and/or power efficiency of the memory device based on the above decoding methods. Therefore, the improved devices and methods overcome the deficiencies of the conventional devices and methods of light detection across pixels and signal clarity related to crosstalk and degradation in image data while reducing resource consumption, data accuracy, and resource allocation (e.g., latency). Further, there is an improvement in speed and resource allocation based on the improved devices and methods performing the crosstalk correction operation on a channel deviation region compared to an entire image data.

Figure 3A:
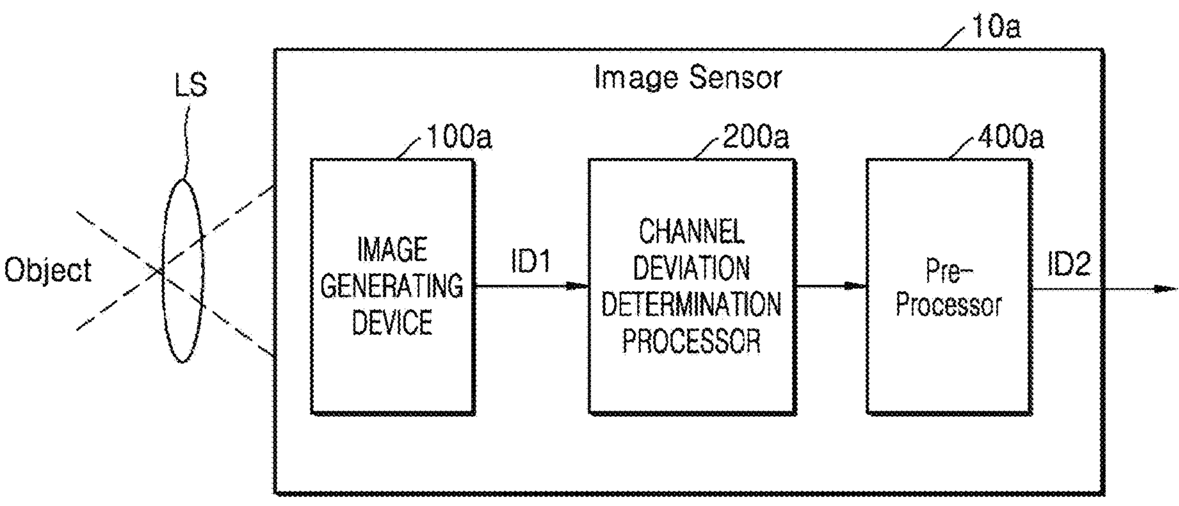
FIGS. 3A and 3B are each a block diagram illustrating an image sensor according to some example embodiments.
Figure 3B:
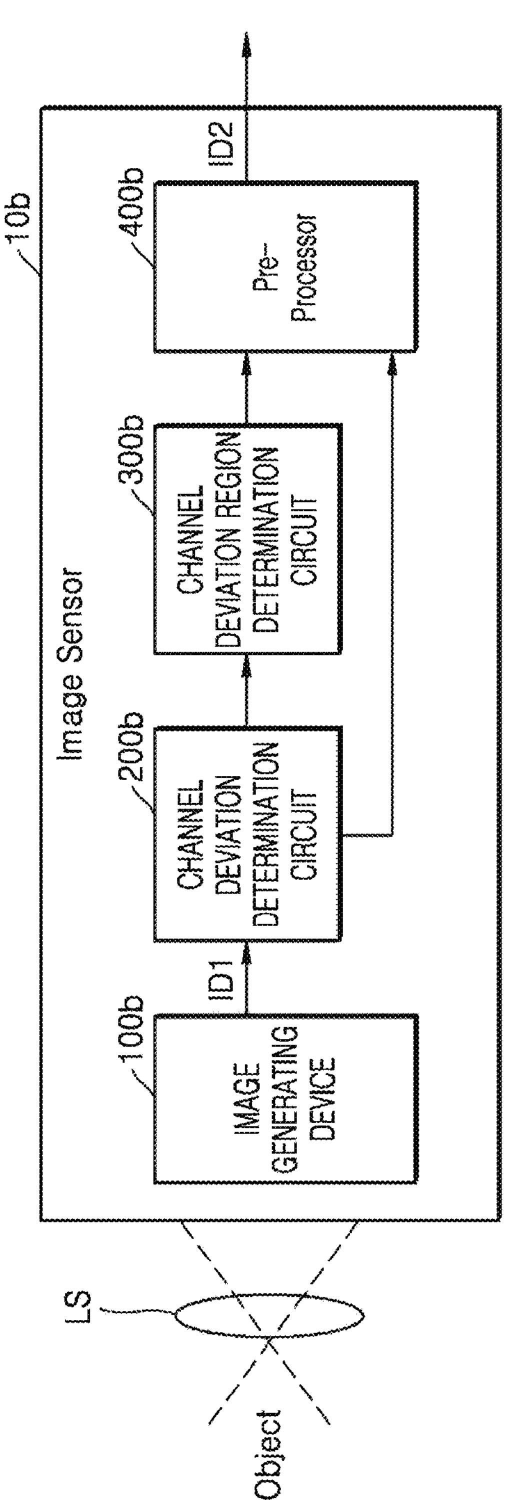

FIGS. 3A and 3B are block diagrams illustrating image sensors 10*a* and 10*b* according to some example embodiments. In some example embodiments, the image sensor 10*a* of FIG. 3A and the image sensor 10*b* of FIG. 3B may be examples of the image sensor 10 of FIG. 1.

Referring to FIGS. 1 and 3A, the image sensor 10*a* may include an image generating device 100*a*, a channel deviation determination processor 200*a*, and a pre-processor 400*a*, and the image generating device 100*a* and the pre-processor 400*a* may be the same as the image generating device 100 and the pre-processor 400 of FIG. 1, respectively. Hereinafter, the same description as that given above with reference to FIG. 1 is omitted.

The channel deviation determination processor 200*a* may determine whether the first image data ID1 is image data in which a channel deviation occurs based on pixel information including pixel codes of a plurality of pixels of the image generating device 100*a*. In some example embodiments, the channel deviation determination processor 200*a* may calculate a saturation ratio of the first image data ID1 based on the pixel codes and determine whether the first image data ID1 is image data in which a channel deviation occurs based on the saturation ratio.

When the channel deviation determination processor 200*a* determines that the first image data ID1 is image data in which a channel deviation occurs, the channel deviation determination processor 200*a* may calculate a determination parameter based on the pixel information and determine at least one channel deviation region within the first image data ID1 based on the calculated determination parameter. The determination parameter may refer to various parameters for determining whether a certain portion in the image data is a channel deviation region. In some example embodiments, the determination parameter may include at least one of power per pixel frequency corresponding to each of the pixels of the image generating device 100*a*, the SAD corresponding to each of the pixels, or brightness corresponding to each of the pixels.

In some example embodiments, when the pre-processor 400*a* receives first image data ID1 in which a channel deviation occurs from the channel deviation determination processor 200*a*, the pre-processor 400*a* may receive a determination parameter and may generate second image data ID2 by performing correction on the at least one channel deviation region within the first image data ID1 based on the determination parameter.

In some example embodiments, when the pre-processor 400*a* receives first image data ID1 in which no channel deviation occurs from the channel deviation determination processor 200*a*, the pre-processor 400*a* may generate the second image data ID2 by performing noise reduction processing, gain adjustment, waveform normalization processing, interpolation processing, white balance processing, gamma processing, edge emphasis processing, binning, etc.

Referring to FIG. 3B, the image sensor 10*b* may include an image generating device 100*b*, a channel deviation determination circuit 200*b*, a channel deviation region determination circuit 300*b*, and a pre-processor 400*b*. The image generating device 100*b* and the pre-processor 400*b* may be the same as the image generating device 100 and the pre-processor 400 of FIG. 1, respectively. Hereinafter, the same description as that given above with reference to FIG. 1 is omitted.

The channel deviation determination circuit 200*b* may be a circuit implemented in hardware within the image sensor 10*b* and may perform the same function as the channel deviation determination processor 200 of FIG. 1. The channel deviation region determination circuit 300*b* may be a circuit implemented in hardware within the image sensor 10*b* and may perform the same function as the channel deviation region determination processor 300 of FIG. 1.

Figure 4:
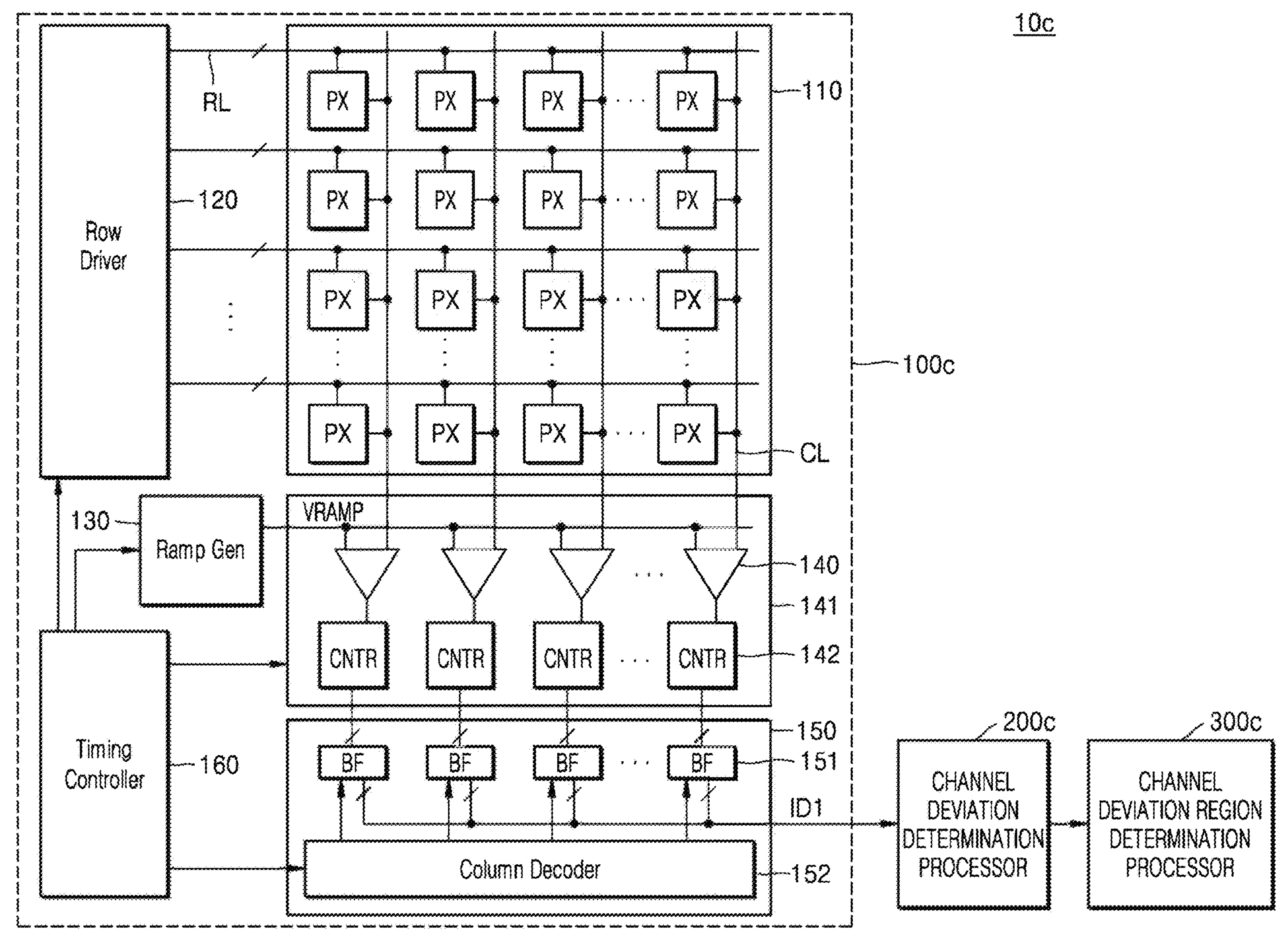
FIG. 4 is a block diagram illustrating an image sensor according to some example embodiments.

FIG. 4 is a block diagram illustrating an image sensor 10*c* according to some example embodiments. In some example embodiments, the image sensor 10*c* of FIG. 4 may be an example of the image sensor 10 of FIG. 1.

Referring to FIGS. 1 and 4, the image sensor 10*c* may include an image generating device 100*c*, a channel deviation determination processor 200*c*, and a channel deviation region determination processor 300*c*. The channel deviation determination processor 200*c* and the channel deviation region determination processor 300*c* may be the same as the channel deviation determination processor 200 and the channel deviation region determination processor 300 of FIG. 1, respectively, and the same descriptions are omitted.

The image generating device 100*c* may include a pixel array 110, a row driver 120, a lamp signal generating device 130, an analog-to-digital conversion circuit 140 (hereinafter, referred to as an ADC circuit), a data output circuit. 150, and a timing controller 160.

The pixel array 110 may include a plurality of pixels PX connected to a plurality of row lines RL and a plurality of column lines CL and arranged in rows and columns. Each of the pixels PX may include at least one photoelectric conversion element, and the pixel PX may detect light using the photoelectric conversion element and output an image signal, which is an electrical signal, according to the detected light. For example, the photoelectric conversion element may include a photo diode, a photo transistor, a photo gate, or a pinned photodiode.

Each of the pixels PX may detect light in a certain spectral range. For example, the pixels PX may include a red pixel for converting light in the red spectral range into an electrical signal, a green pixel for converting light in the green spectral range into an electrical signal, and a blue pixel for converting light in the blue spectral region into an electrical signal. However, without being limited thereto, and the pixels may further include a white pixel. As another example, the pixels may include pixels including a combination of different colors, such as a yellow pixel, a cyan pixel, and a green pixel.

A color filter array may be placed on top of the pixels PX to allow light in a certain spectral range to be transmitted therethrough, and the color that may be detected by the corresponding pixel may be determined according to the color filter placed on top of each of the pixels. However, the inventive concepts are not limited thereto, and in some example embodiments, a certain photoelectric conversion element may convert light of a certain wavelength band into an electrical signal depending on a level of the electrical signal applied to the photoelectric conversion element.

The pixels PX may be configured in a certain pattern. For example, the certain pattern may be a tetra pattern including red pixels R arranged in a 2×2 matrix, blue pixels B arranged in a 2×2 matrix, and green pixels G arranged in a 2×2 matrix. For example, the certain pattern may be a nona pattern including red pixels R arranged in a 3×3 matrix, blue pixels B arranged in a 3×3 matrix, and green pixels G arranged in a 3×3 matrix. For example, the certain pattern may be a tetra square (tetra^2) pattern including red pixels R arranged in a 4×4 matrix, blue pixels B arranged in a 4×4 matrix, and green pixels G arranged in a 4×4 matrix. For example, the certain pattern may be a Q-cell pattern including red pixels R arranged in a 2×2 matrix and sharing one lens, blue pixels B arranged in a 2×2 matrix and sharing one lens, and green pixels G arranged in a 2×2 matrix and sharing one lens. However, without being limited thereto, the certain pattern may include various other patterns.

The row driver 120 drives the pixel array 110 in row units. The row driver 120 may decode a row control signal (e.g., an address signal) received from the timing controller 160 and select at least one of the row lines constituting the pixel array 110 in response to the decoded row control signal. For example, the row driver 120 may generate a selection signal to select one of a plurality of rows. Also, the pixel array 110 outputs a pixel signal, for example, a pixel voltage, from a row selected by the selection signal provided from the row driver 120. The pixel signal may include a reset signal and an image signal. The row driver 120 may transmit control signals for outputting a pixel signal to the pixel array 110, and the pixel PX may operate in response to the control signals to output a pixel signal.

The ramp signal generating device 130 may generate a ramp signal (e.g., a ramp voltage, VRAMP) having a level rising or falling with a certain slope under control by the timing controller 160.

The ADC circuit 140 may include a plurality of comparators 141 and a plurality of counter circuits 142. The ADC circuit 140 may convert a pixel signal (e.g., a pixel voltage) input from the pixel array 110 into a pixel value that is a digital signal. Each pixel signal received through each of the column lines CL is converted into a pixel value, which is a digital signal, by the comparators 141 and the counter circuit 142.

The comparators 141 may be a plurality of correlated double sampling (CDS) circuits. The CDS circuit may sample the pixel signal provided from the pixel PX according to a CDS method. The CDS circuit may sample a reset signal received as a pixel signal and compare the reset signal with the ramp signal VRAMP to generate a comparison signal according to the reset signal. The CDS circuit may store the reset signal. Thereafter, the CDS circuit may sample an image signal correlated to the reset signal and compare the image signal with the ramp signal VRAMP to generate a comparison signal according to the image signal.

The counter circuit 142 may count a level transition point of a comparison result signal output from the comparators 141 and output a count value. In some example embodiments, the counter circuit 142 may include a latch circuit and an arithmetic circuit.

The data output circuit 150 may temporarily store the pixel value output from the ADC circuit 140 and then output the pixel value. The data output circuit 150 may include a plurality of column memories 151 and a column decoder 152. The column memory 151 stores the pixel value received from the counter circuit 142. In some example embodiments, each of the column memories 151 may be provided in the counter circuit 142. A plurality of pixel values stored in the column memories 151 may be output as the first image data ID1 under control by the column decoder 152.

The timing controller 160 outputs control signals to each of the row driver 120, the ramp signal generating device 130, the ADC circuit 140, and the data output circuit 150 to control an operation or timing of the driver 120, the ramp signal generating device 130, the ADC circuit 140, and the data output circuit 150.

Figure 5:
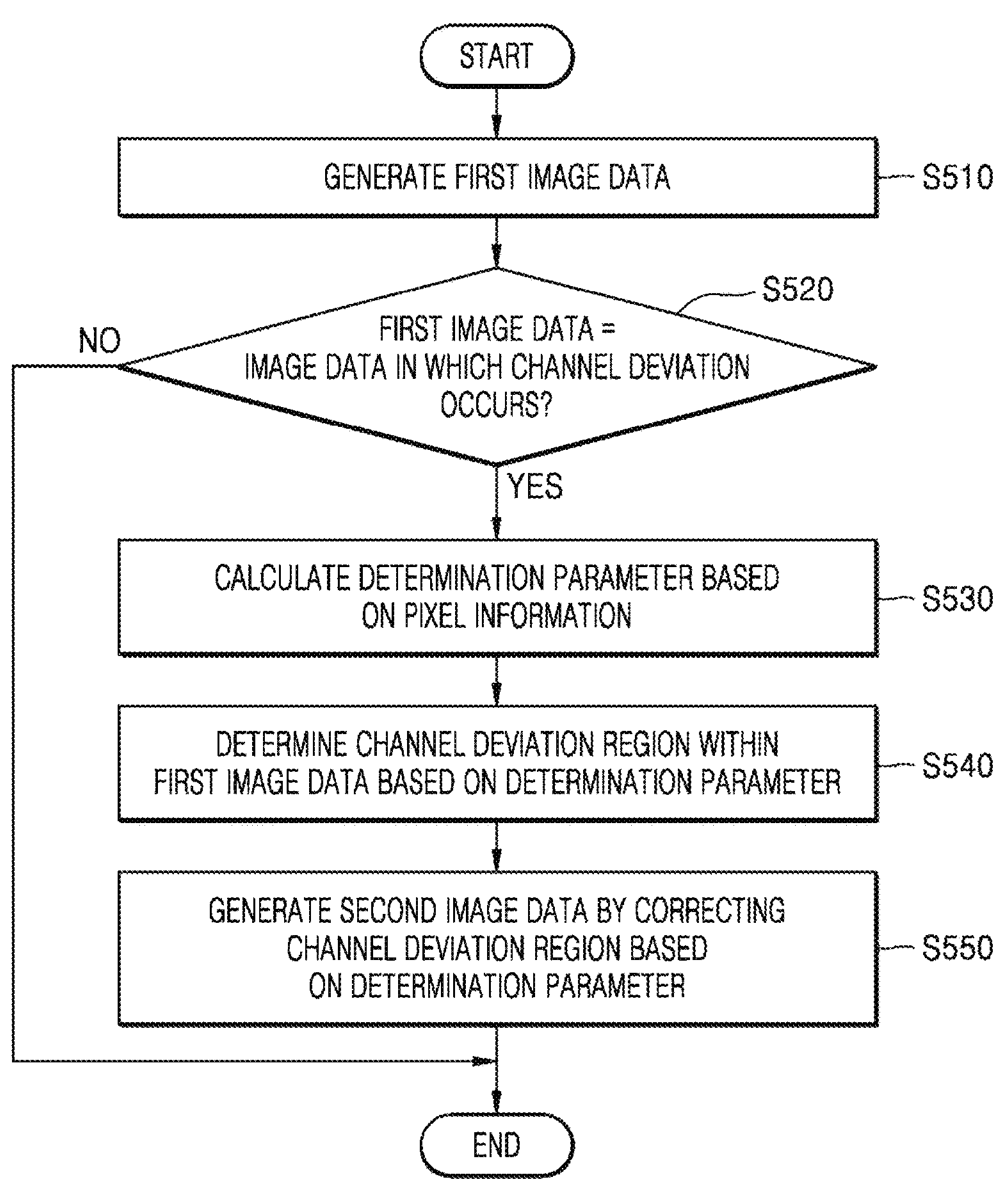
FIG. 5 is a flowchart illustrating an operating method of an image sensor according to some example embodiments.

FIG. 5 is a flowchart illustrating an operating method of an image sensor according to some example embodiments. As shown in FIG. 5, the operating method of an image sensor may include a plurality of operations (S510 to S550), and the operating method of an image sensor may refer to a method of crosstalk correction operation for image data in which a channel deviation occurs.

Referring to FIGS. 1 and 5, in operation S510, the image sensor 10 may generate the first image data ID1. In some example embodiments, the image generating device 100 may generate the first image data ID1, which is image data, based on a pixel signal, and the first image data ID1 may include pixel information. The pixel information may refer to information related to a plurality of pixels corresponding to the first image data ID1.

In operation S520, the image sensor 10 may determine whether the first image data ID1 is image data in which a channel deviation occurs based on pixel information of a plurality of pixels. In some example embodiments, the channel deviation determination processor 200 may calculate a saturation ratio of the first image data ID1 based on the pixel codes and determine whether the first image data ID1 is image data in which a channel deviation occurs based on the saturation ratio.

In some example embodiments, when it is determined that the first image data ID1 is not image data in which a channel deviation occurs, the image sensor 10 may stop the crosstalk correction operation and transmit the first image data ID1 to the pre-processor 400.

In some example embodiments, when the channel deviation determination processor 200 determines that the first image data ID1 is image data in which a channel deviation occurs, the channel deviation determination processor 200 may transmit the first image data ID1 to the channel deviation region determination processor 300, and the image sensor 10 may perform operation S530.

In operation S530, the image sensor 10 may calculate a determination parameter based on the pixel information. In some example embodiments, the channel deviation region determination processor 300 may receive the first image data ID1 from the channel deviation determination processor 200 and calculate a determination parameter based on the pixel information. At least one channel deviation region within the first image data ID1 may be determined based on the determination parameter. The determination parameter may refer to various parameters for determining whether a certain portion within the image data is a channel deviation region.

In some example embodiments, the channel deviation region determination processor 300 may calculate at least one of power per pixel frequency corresponding to each of the pixels of the image generating device 100, an SAD corresponding to each of the pixels, or brightness corresponding to each of the pixels based on the pixel codes of the first image data ID1.

In operation S540, the image sensor 10 may determine a channel deviation region within the first image data based on the determination parameter. In some example embodiments, the channel deviation region determination processor 300 may determine at least one channel deviation region within the first image data ID1 based on the determination parameter. For example, the channel deviation region determination processor 300 may determine at least one channel deviation region within the first image data ID1 based on the power per pixel frequency, the SAD, and the brightness.

In operation S550, the image sensor 10 may generate the second image data ID2 by correcting the channel deviation region based on the determination parameter. In some example embodiments, the pre-processor 400 may receive the first image data ID1 including at least one channel deviation region and the determination parameter from the channel deviation region determination processor 300 and perform correction on the at least one channel deviation region within the first image data ID1 based on the determination parameter to generate the second image data ID2. For example, the pre-processor 400 may perform a filtering operation on the channel deviation region based on the determination parameter. The filtering operation may refer to an operation of offsetting the pixel codes in the channel deviation region in a frequency band with the power per pixel frequency among the determination parameters, and a high frequency component may be removed from the channel deviation region in which the filtering operation is performed, thereby resolving the generated channel deviation.

In the operating method of the image sensor, whether image data captured and generated by the sensor has a channel deviation may be determined without interworking with an external device of the sensor, and thus, a crosstalk correction operation may be performed relatively rapidly. In addition, in the operating method of the image sensor, a channel deviation region within the image data in which a channel deviation occurs may be determined, and the crosstalk correction operation is performed on the channel deviation region, so that resolution loss for the image data may be reduced, compared to the crosstalk correction operation performed on the entire image data, thereby improving quality of the image data.

Figure 6:
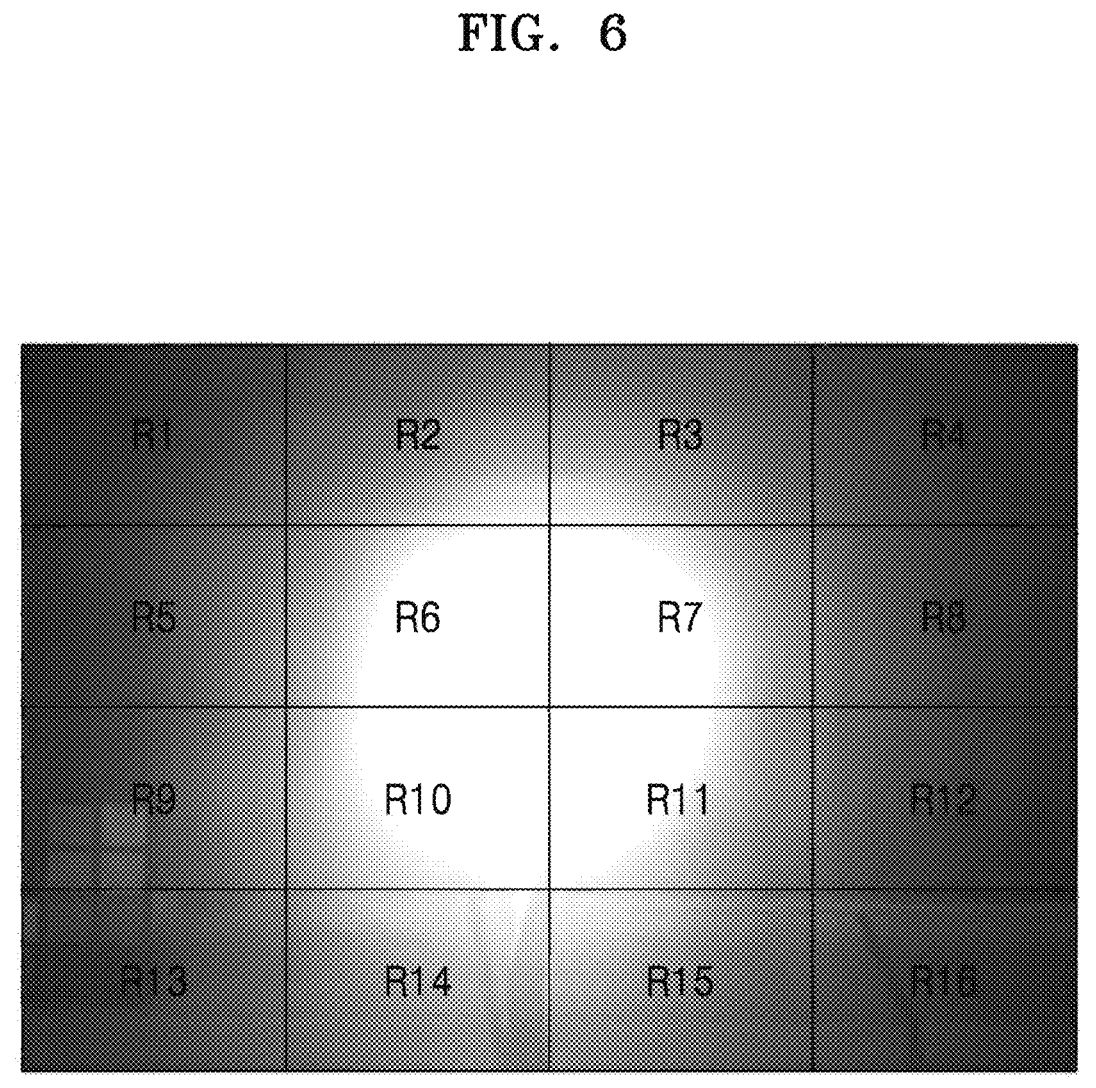

FIG. 6 is a diagram illustrating an operation of determining whether image data has a channel deviation in an operating method of an image sensor according to some example embodiments.

Referring to FIGS. 1 and 6, a second image 3 may be an example in which the image sensor 10 divides the first image 2 of FIG. 2A into a plurality of regions. The second image 3 represents an image obtained by dividing the first image 2 of FIG. 2A into a 4×4 matrix by the image sensor 10 but is not limited thereto. For example, the image sensor 10 may divide the first image 2 of FIG. 2A into an N×M matrix (N and M are natural numbers of 1 or greater), and the N×M matrix may be set by the user or may be a preset (or, alternatively, desired or generated) matrix.

In some example embodiments, the channel deviation determination processor 200 may divide the first image data ID1, which is the second image 3, into a plurality of regions R1 to R16, calculate an average value of pixel codes included in each of the regions R1 to R16, and count the number of regions having a value equal to or greater than a threshold pixel code, among the calculated average values, thereby calculating a saturation ratio of the first image data ID1. The threshold pixel code may be a pixel code arbitrarily set by the user of the image sensor 10 or may be a preset (or, alternatively, desired or generated) pixel code. If the saturation ratio is greater than or equal to a threshold ratio, the channel deviation determination processor 200 may determine the second image 3 as image data in which a channel deviation occurs. The threshold ratio may be a ratio arbitrarily set by the user of the image sensor 10 or may be a preset (or, alternatively, desired or generated) ratio.

For example, if the threshold ratio is about or exactly 25%, the average value of the pixel codes included in each of the regions (R6, R7, R10, and R11) including a light source may have a value greater than or equal to the threshold pixel code, and because the ratio of the number (4) of saturated regions to the number (16) of saturated regions is about or exactly 25%, the channel deviation determination processor 200 may determine the second image 3 as image data in which a channel deviation occurs.

In some example embodiments, the channel deviation determination processor 200 may calculate the average value of the pixel codes included in each of the regions R1 to R16 and a variance of the average value with adjacent regions among the regions R1 to R16 may be measured, and if a certain variance trend is detected, the channel deviation determination processor 200 may determine the third image 3 as image data in which a channel deviation occurs. For example, a certain variance trend may refer to a case in which a variance in consecutive regions gradually increases or decreases.

The image sensor 10 may divide the image data into a plurality of regions to reduce the number of count operations to obtain the saturation ratio, thereby improving the performance of determining whether the image data has a channel deviation.

Figure 7:
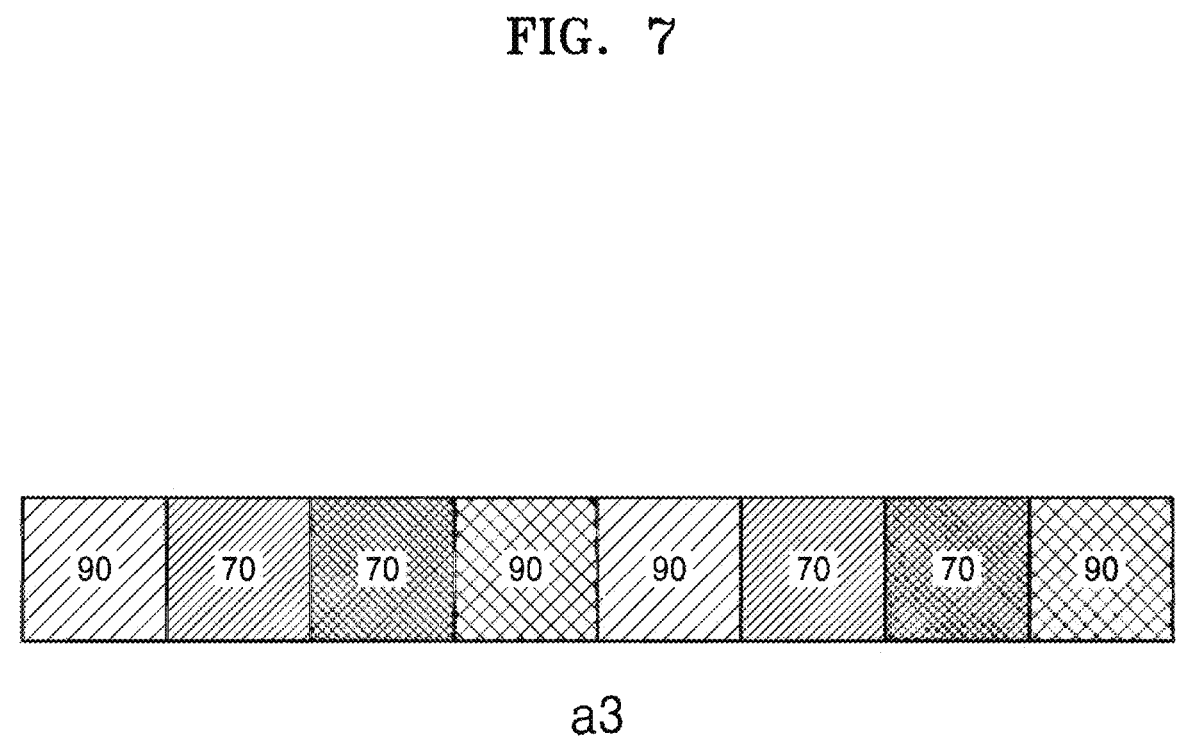

FIG. 7 is a diagram illustrating an operation of determining a channel deviation region in an operating method of an image according to some example embodiments.

Referring to FIGS. 1 and 7, a fifth figure a3 may be a figure illustrating pixels in a first row, which is a portion of the first figure a1 of FIG. 2B including the pixels in the 8×8 matrix. Pixel codes of the pixels of the same color arranged in the 2×2 matrix may be different from each other. The pixel codes of the first, fourth, fifth, and eighth columns may be 90, and the pixel codes of the second, third, sixth, and seventh columns may be 70.

In some example embodiments, the channel deviation region determination processor 300 may calculate power per pixel frequency corresponding to each of the pixels based on the pixel codes. The pixel frequency may indicate the frequency of change of the pixel codes, and in the fifth figure a3, the pixel code value changes for each pixel, so the pixel frequency may be 1 pixel. The power per pixel frequency may be calculated by performing filtering corresponding to the pixel frequency on each of the pixel codes.

For example, because the fifth figure a3 has a 1 pixel period, the channel deviation region determination processor 300 may calculate power per pixel frequency corresponding to pixels of the first column as 20, power per pixel frequency corresponding to pixels of the second column as 0, power per pixel frequency corresponding to pixels of the third column as 20, and power per pixel frequency corresponding to pixels of the fourth column as 0 by convolving a (1, −1, 1, −1) matrix for the fifth figure a3. In the fifth figure a3, the power per pixel frequency for the red pixels R and the power per pixel frequency for the green pixels G are calculated, but are not limited thereto. For example, the power per pixel frequency for the blue pixels B may be calculated, and the power per pixel frequency may be calculated for each pixel of the same color.

In some example embodiments, the channel deviation region determination processor 300 may determine a channel deviation region based on the power per pixel frequency. For example, power per pixel frequency corresponding to a pixel included in the channel deviation region may be measured as a power exceeding a threshold power, and power per pixel frequency corresponding to a pixel not included in the channel deviation region may be measured as 0. The threshold power may be a preset (or, alternatively, desired or generated) power. Accordingly, the channel deviation region determination processor 300 may determine a region including the fifth figure a3 of the first image data ID1 as the channel deviation region.

Figure 8:
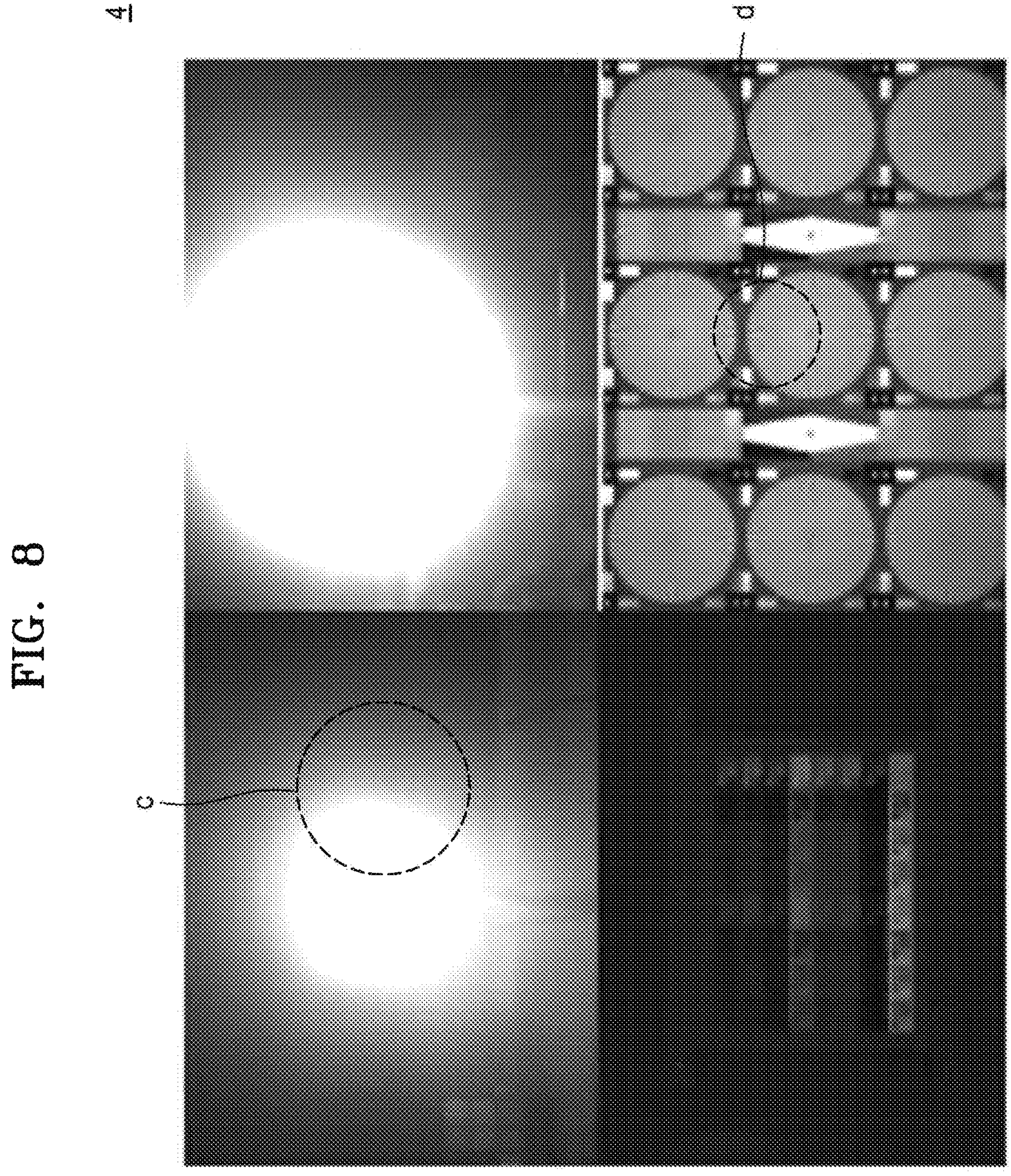
FIG. 8 is a diagram illustrating an operation of determining a channel deviation region in an operating method of an image sensor according to some example embodiments.

FIG. 8 is a diagram illustrating an operation of determining a channel deviation region in an operating method of an image sensor according to some example embodiments.

Referring to FIGS. 1 and 8, a third image 4 may include a white light source located at the top left and top right, and a third region c may represent a channel deviation region in which relatively strong light from the light source is incident in the second direction, and a fourth region d may represent a boundary between subjects that are not affected by the light source. The channel deviation determination processor 200 may determine the third image 4 as an image in which a channel deviation occurs based on pixel codes of the third image 4.

In some example embodiments, the channel deviation region determination processor 300 may calculate a determination parameter based on the pixel codes of the third image 4 for the third region c, and may determine the third region c as a channel deviation region based on the calculated determination parameter. The determination parameter may be either power per pixel frequency corresponding to each of the pixels in the third image 4 or brightness corresponding to each of the pixels in the third image 4.

In some example embodiments, the channel deviation region determination processor 300 may determine at least one channel deviation region by dividing the channel deviation region and a boundary region based on the power per pixel frequency corresponding to each of the pixels within the third image 4 and the pixel codes within the third image 4. The boundary region may refer to a region that is not a channel deviation region but corresponds to the boundary between subjects.

For example, the channel deviation region determination processor 300 may classify, as the boundary region, a case in which a value obtained by dividing the sum of absolute values of the power per pixel frequency of each of the pixels included in a certain region within the third image 4 by the sum of the pixel codes is smaller than a threshold value, and classify, as the channel deviation region, a case in which the value is equal to or greater than the threshold value. The threshold value may be set by the user of the image sensor 10 or may be a preset (or, alternatively, desired or generated) value. For example, when the threshold is 0.05, a value obtained by dividing the sum of the absolute values of the power per pixel frequency of each of the pixels included in the third region c by the sum of the pixel codes of each of the pixels included in the third region c may be greater than or exactly 0.05, and a value obtained by dividing the sum of absolute values of the power per pixel frequency of each of the pixels included in the fourth region d by the sum of the pixel codes of each of the pixels included in the fourth region d may be smaller than 0.05. Accordingly, the channel deviation region determination processor 300 may determine the third region c as the channel deviation region and the fourth region d as the boundary region.

In some example embodiments, the channel deviation region determination processor 300 may determine at least one channel deviation region based on the brightness corresponding to each of the pixels within the third image 4. Based on the pixel code, a higher pixel code may refer to a pixel with a relatively bright value, and a lower pixel code may refer to a pixel with a relatively dark value. For example, the pixel codes of the pixels in the center portion of the light source at the top left and the light source at the top right of the third image 4 may exceed an upper threshold limit value, and the pixel codes of the pixels in the dark portion of the third image 4 may be less than a lower threshold limit value. The upper threshold limit and lower threshold limit may be preset (or, alternatively, desired or generated) values. A region that is less than the lower threshold limit or more than the upper threshold limit may be a region in which crosstalk does not occur due to channel deviation, so the channel deviation region determination processor 300 may determine, as the channel deviation region, a region including pixels having brightness equal to or greater than the lower threshold limit value and equal to or less than the upper threshold limit value.

In some example embodiments, the pre-processor 400 may generate the second image data ID2 by correcting only at least one channel deviation region based on the power per pixel frequency corresponding to each of the pixels included in the third image 4. For example, the pre-processor 400 may receive the third image 4 including at least one channel deviation region from the channel deviation region determination processor 300 and perform crosstalk correction on the third region c based on the power per pixel frequency corresponding to each of the pixels included in the third region c determined as the channel deviation region. The pre-processor 400 may not perform crosstalk correction on the fourth region d, which is determined to be a boundary region. Accordingly, the image sensor 10 performs crosstalk correction only on the channel deviation region in the image (e.g., the third image 4) generated in the channel deviation region, and thus, the second image data ID2 having improved image quality may be generated, compared to a case in which crosstalk correction is performed on the entire image (e.g., the third image 4) generated in the channel deviation region.

FIG. 9 is a diagram illustrating an operation of determining a channel deviation region in an operating method of an image sensor according to some example embodiments.

Referring to FIGS. 1 and 9, a sixth figure a4 may be the same as the first figure a1 of FIG. 2B. Hereinafter, the same description as that given above with reference to the figure a1 is omitted. In some example embodiments, the channel difference region determination processor 300 may calculate an SAD corresponding to each of a plurality of pixels included in the sixth figure a4. The SAD may refer to a value calculated by comparing a pixel code difference value between a first pixel and a second pixel among pixels of the same color with a pixel code difference value between the first pixel and a third pixel located at the same phase as the first pixel. The same phase may refer to that a certain pixel is located at the same position as another certain pixel among pixels in a 2×2 matrix of the same color adjacent to a 2×2 matrix in which the certain pixel is located.

For example, the channel deviation region determination processor 300 may calculate a pixel code difference value between the first pixel PX1 and the second pixel PX2 located in the same 2×2 matrix and calculate a pixel code difference value between the first pixel PX1 and the third pixel PX3 located at the same phase as the first pixel PX1. Due to the light source in the second direction, the pixel code difference value between the first pixel PX1 and the second pixel PX2 may be 0 or greater, and the pixel code difference value between the first pixel PX1 and the third pixel PX3 may be 0. Because the pixel code difference value between the first pixel PX1 and the second pixel PX2 is greater than the pixel code difference value between the first pixel PX1 and the third pixel PX3, the channel deviation region determination processor 300 may determine the sixth figure a4 as a channel deviation region.

In some example embodiments, referring further to FIG. 8, the channel deviation region determination processor 300 determine a channel deviation region by considering all of the power per pixel frequency corresponding to each of the pixels included in the third image 4, the SAD corresponding to each of the pixels, and the brightness corresponding to each of the pixels. For example, the channel deviation region determination processor 300 may determine, as a channel deviation region, a region including pixels in which power per pixel frequency is equal to or greater than the threshold power, the SAD is equal to or greater than the threshold SAD, and the brightness is equal to or greater than the lower threshold limit value and equal or less than an upper threshold limit value, among the pixels included in the third image 4.

Figure 10:
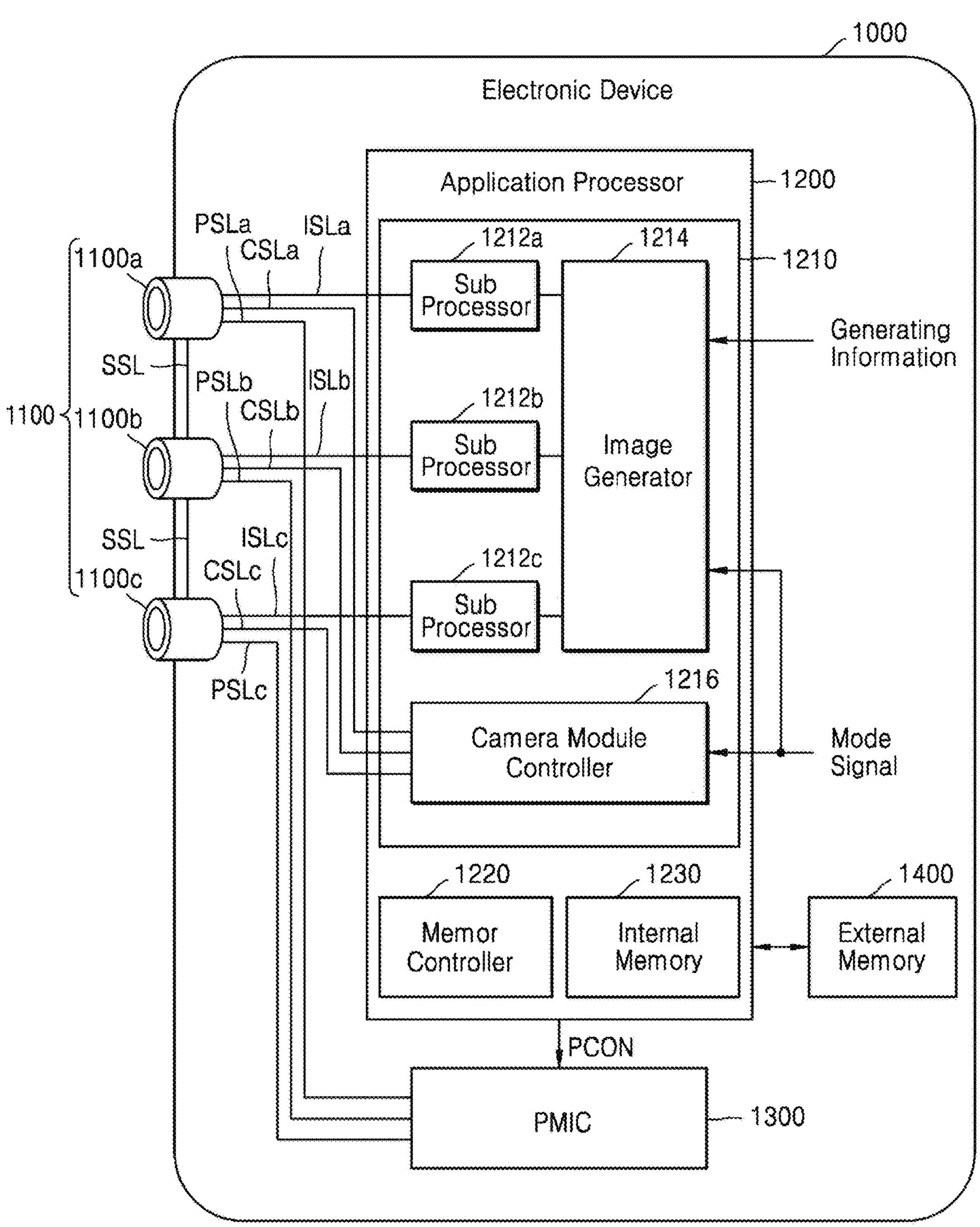
FIG. 10 is a block diagram illustrating an electronic device including a multi-camera module according to some example embodiments.

FIG. 10 is a block diagram illustrating an electronic device 1000 including a multi-camera module according to some example embodiments.

Referring to FIG. 10, the electronic device 1000 may include a camera module group 1100, an application processor 1200, a power management integrated circuit (PMIC) 1300, and an external memory 1400.

The camera module group 1100 may include a plurality of camera modules 1100*a*, 1100*b*, and 1100*c*. Although the drawing shows some example embodiments in which three camera modules 1100*a*, 1100*b*, and 1100*c* are arranged, the embodiments are not limited thereto. In some example embodiments, the camera module group 1100 may include only two camera modules or may be modified to include n camera modules (n is a natural number of 4 or greater).

The descriptions of the channel deviation determination processor 200, the channel deviation region determination processor 300, or the channel deviation determination processor 200*a* given above with reference to FIGS. 1 to 9 may be applied to the camera module group 1100. In some example embodiments, when a channel deviation occurs in image data generated by the camera module group 1100 without interworking with the application processor 1200, the camera module group 1100 may determine whether the image data has a channel deviation based on pixel information.

In some example embodiments, the camera module group 1100 may calculate a determination parameter based on pixel information for the determined image data in which the channel deviation occurs, and determine a channel deviation region within the image data based on the calculated determination parameter.

In some example embodiments, the camera module group 1100 may perform a crosstalk correction operation only on the channel deviation region within the image data. Accordingly, the camera module group 1100 may operate more rapidly than determining whether image data has a channel deviation in conjunction with the application processor 1200 and reduce resolution loss for the image data compared to performing a crosstalk correction operation for the entire image data, thereby improving quality of the image data.

The application processor 1200 may include an image processing device 1210, a memory controller 1220, and an internal memory 1230. The application processor 1200 may be implemented separately from the camera modules 1100*a*, 1100*b*, and 1100*c*, for example, as separate semiconductor chips.

The internal memory 1230 or the external memory 1400 may store various data, such as the second image data ID2. The memory controller 1220 may control the operation of the internal memory 1230.

The image processing device 1210 may include a plurality of sub processors 1212*a*, 1212*b*, and 1212*c*, an image generator 1214, and a camera module controller 1216.

The image processing device 1210 may include the sub-image processors 1212*a*, 1212*b*, and 1212*c* corresponding to the number of camera modules 1100*a*, 1100*b*, and 1100*c*.

The camera module controller 1216 may provide control signals respectively to the camera module 1100*a*, 1100*b*, and 1100*c*. The control signals generated by the camera module controller 1216 may be provided to the corresponding camera modules 1100*a*, 1100*b*, and 1100*c* through separate control signal lines CSLa, CSLb, and CSLc.

Image data generated by the camera module 1100*a* may be provided to the sub processor 1212*a* through an image signal line ISLa, image data generated by the camera module 1100*b* may be provided to a sub processor 1212*b* through an image signal line ISLb, and image data generated by the camera module 1100*c* may be provided to a sub processor 1212*c* through an image signal line ISLc. Such image data transmission may be performed using, for example, a camera serial interface (CSI) based on a mobile industry processor interface (MIPI) but is not limited thereto.

Each of the sub processors 1212*a*, 1212*b*, and 1212*c* may perform image processing, such as bad pixel correction, 3A adjustment (auto-focus correction, auto-white balance, auto-exposure), noise reduction, sharpening, gamma control, and remosaic, on the image data provided from the camera modules 1100*a*, 1100*b*, and 1100*c*.

In some example embodiments, remosaic signal processing may be performed in each of the camera modules 1100*a*, 1100*b*, and 1100*c* and then provided to the sub processors 1212*a*, 1212*b*, and 1212*c*.

The image data processed by each of the sub processors 1212*a*, 1212*b*, and 1212*c* may be provided to the image generator 1214. The image generator 1214 may generate an output image using the image data provided from each of the sub processors 1212*a*, 1212*b*, and 1212*c* according to image generating information or mode signal.

In detail, the image generator 1214 may generate an output image by merging at least some of the image data generated by the sub processors 1212*a*, 1212*b*, and 1212*c* according to the image generating information or the mode signal. In addition, the image generator 1214 may generate an output image by selecting one of the image data generated by the sub processors 1212*a*, 1212*b*, and 1212*c* according to image generating information or the mode signal.

In some example embodiments, the image generating information may include a zoom signal or zoom factor. In addition, in some example embodiments, the mode signal may be a signal based on a mode selected by the user, for example.

When the image generating information is a zoom signal (zoom factor) and each of the camera modules 1100*a*, 1100*b*, and 1100*c* has a different observation field (viewing angle), the image generator 1214 may perform different operations depending on the type of zoom signal. For example, when the zoom signal is a first signal, an output image may be generated using image data output from the sub-image processor 1212*a* and image data output from the sub-image processor 1212*b*, among the image data output from the sub-image processor 1212*a* and image data output from the sub-image processor 1212*c*. If the zoom signal is a second signal, different from the first signal, the image generator 1214 may generate an output image using the image data output from the sub-image processor 1212*c* and image data output from the sub-image processor 1212*b*, among the image data output from the sub-image processor 1212*a* and the image data output from the sub-image processor 1212*c*. If the zoom signal is a third signal, different from the first and second signals, the image generator 1214 may generate an output image by selecting one of the image data output from each of the sub-image processors 1212*a*, 1212*b*, and 1212*c*, without performing image data merging. However, the embodiments are not limited thereto, and the method of processing image data may be modified and implemented as necessary.

Figure 11:
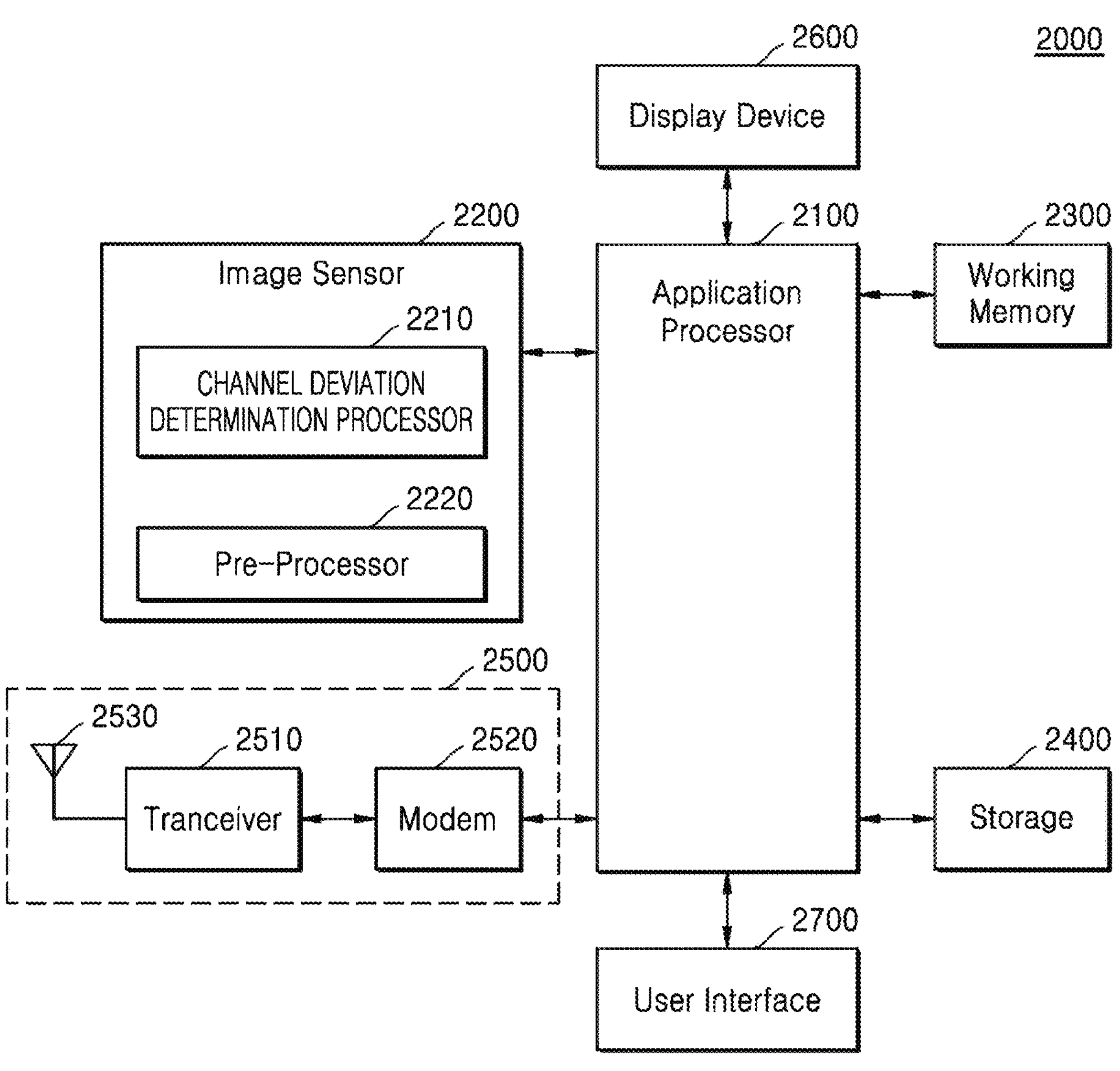
FIG. 11 is a block diagram illustrating an image processing system according to some example embodiments.

FIG. 11 is a block diagram illustrating an image processing system according to some example embodiments.

An electronic device 2000 of FIG. 11 may be a portable terminal.

Referring to FIG. 11, the electronic device 2000 may include an application processor 2100, an image sensor 2200, a working memory 2300, a storage 2400, a display device 2600, a user interface 2700, and a wireless transceiver 2500.

The application processor 2100 may control the overall operation of the electronic device 2000 and may be implemented as an SoC that runs an application program, operating system, etc. The application processor 2100 may provide image data provided from the image sensor 2200 to the display device 2600 or store the image data in the storage 2400.

The image sensor 2200 may include a channel deviation determination processor 2210 and a pre-processor 2220. The descriptions of the channel deviation determination processor 200*a* and the pre-processor 400 given above with reference to FIGS. 1 to 9 may be applied to the channel deviation determination processor 2210 and the pre-processor 2220.

In some example embodiments, if a channel deviation occurs in image data generated by the image sensor 2200 without interworking with the application processor 2100, the channel deviation determination processor 2210 may determine whether the image data has a channel deviation based on pixel information.

In some example embodiments, the channel deviation determination processor 2210 may calculate a determination parameter based on the pixel information for the determined image data in which a channel deviation occurs, and determine a channel deviation region within the image data based on the calculated determination parameter.

In some example embodiments, the pre-processor 2220 may perform a crosstalk correction operation only on the channel deviation region within the image data. Accordingly, the image sensor 2200 may operate more rapidly than determining whether image data has a channel deviation in conjunction with the application processor 1200 and reduce resolution loss for the image data compared to performing a crosstalk correction operation for the entire image data, thereby improving quality of the image data.

The working memory 2300 may be implemented as volatile memory, such as dynamic random access memory (DRAM) or static random access memory (SRAM), or non-volatile resistive memory, such as ferroelectric random access memory (FeRAM), resistive random access memory (RRAM), phase-change random access memory (PRAM). The working memory 2300 may store programs and/or data that the application processor 2100 processes or executes.

The working memory 2300 may receive and store fixed pattern noise (FPN) information from the application processor 2100. The working memory 2300 may store the FPN information to correspond to a column line or row line.

The storage 2400 may be implemented as a non-volatile memory device, such as NADN flash or resistive memory. For example, the storage 2400 may be provided as a memory card (multimedia card (MMC), embedded MMC (eMMC), secure digital (SD), micro SD), etc. The storage 2400 may store image data received from the image sensor 2200 or data processed or generated by the application processor 2100.

The user interface 2700 may be implemented with various devices capable of receiving a user input, such as a keyboard, a curtain key panel, a touch panel, a fingerprint sensor, and a microphone. The user interface 2700 may receive a user input and provide a signal corresponding to the received user input to the application processor 2100.

The wireless transceiver 2500 may include a transceiver 2510, a modem 2520, and an antenna 2530.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

While the inventive concepts have been particularly shown and described with reference to embodiments thereof, it will be understood that various changes in form and details may be made therein without departing from the spirit and scope of the following claims.

What is claimed is:

1. An image sensor comprising:

an image generating device including a plurality of pixels configured to generate a plurality of pixel signals, the image generating device configured to generate first image data including pixel information based on the plurality of pixel signals;

a channel deviation determination processor configured to receive the first image data and determine, based on the pixel information, whether the first image data is channel deviation image data in which a channel deviation has occurred;

a channel deviation region determination processor configured to calculate a determination parameter based on the pixel information, in response to the first image data being determined to be the channel deviation image data, and determine at least one channel deviation region within the first image data, based on the calculated determination parameter; and a pre-processor configured to generate second image data by correcting the at least one channel deviation region of the first image data, based on the determination parameter, the pixel information including pixel codes of the plurality of pixels.

2. The image sensor of claim 1, wherein the channel deviation determination processor is configured to calculate a saturation ratio of the first image data, based on the pixel codes, and determine the first image data as the channel deviation image data, in response to the saturation ratio being greater than or equal to a threshold ratio.

3. The image sensor of claim 2, wherein the channel deviation determination processor is configured to calculate the saturation ratio of the first image data by counting a number of pixel codes having a value greater than or equal to a threshold pixel code among the pixel codes.

4. The image sensor of claim 2, wherein the channel deviation determination processor is configured to calculate the saturation ratio of the first image data by dividing the first image data into a plurality of regions, calculate average values of pixel codes included in each of the plurality of regions, and count a number of regions having a value greater than or equal to a threshold pixel code among the calculated average values.

5. The image sensor of claim 1, wherein the determination parameter includes at least one of power per pixel frequency corresponding to each of the plurality of pixels, a sum of absolute difference (SAD) corresponding to each of the plurality of pixels, or brightness corresponding to each of the plurality of pixels.

6. The image sensor of claim 5, wherein the channel deviation region determination processor is configured to determine the at least one channel deviation region, based on pixels in which the power per pixel frequency is equal to or greater than a threshold power, the SAD is equal to or greater than a threshold SAD, and the brightness is equal to or greater than a lower threshold limit value and equal to or less than an upper threshold limit value, among the plurality of pixels.

7. The image sensor of claim 5, wherein the channel deviation region determination processor is configured to determine, in response to pixels having power per pixel frequency equal to or greater than a threshold power being repeated in a row line direction or a column line direction of the plurality of pixels, a region including the pixels having the power per pixel frequency equal to or greater than the threshold power to be the at least one channel deviation region.

8. The image sensor of claim 5, wherein the channel deviation region determination processor is configured to determine the at least one channel deviation region by classifying a channel deviation region and a boundary region, based on the power per pixel frequency corresponding to each of the plurality of pixels and the pixel codes.

9. The image sensor of claim 5, wherein the pre-processor is configured to generate the second image data by correcting only the at least one channel deviation region, based on the power per pixel frequency of each of the plurality of pixels.

10. The image sensor of claim 1, wherein the pixel information further includes channel information including color information of the plurality of pixels, and the pre-processor is configured to generate the second image data by correcting only a certain channel within the at least one channel deviation region, based on the channel information.

11. The image sensor of claim 1, wherein the plurality of pixels are configured to have a certain pattern, and the certain pattern includes at least one of a tetra pattern, a nono pattern, a tetra square (tetra^2) pattern, or a Q-cell pattern.

12. An image sensor comprising:

an image generating device including a plurality of pixels configured to generate a plurality of pixel signals, and the image generating device configured to generate first image data, the first image data including pixel codes of the plurality of pixels, based on the plurality of pixel signals;

a channel deviation determination processor configured to receive the first image data, determine whether the first image data is channel deviation image data in which a channel deviation has occurred, calculate a determination parameter, based on the pixel codes, in response to the first image data being channel deviation image data, and determine at least one channel deviation region within the first image data, based on the calculated determination parameter; and a pre-processor configured to generate second image data by correcting the at least one channel deviation region of the first image data, based on the determination parameter, the channel deviation determination processor configured to calculate a saturation ratio of the first image data, based on the pixel codes, and determine the first image data to be channel deviation image data, based on the saturation ratio being greater than or equal to a threshold ratio.

13. The image sensor of claim 12, wherein the channel deviation determination processor is configured to calculate the saturation ratio of the first image data by dividing the first image data into a plurality of regions, calculating average values of pixel codes included in each of the plurality of regions, and counting a number of regions having a value greater than or equal to a threshold pixel code among the calculated average values.

14. The image sensor of claim 12, wherein the determination parameter includes at least one of power per pixel frequency corresponding to each of the plurality of pixels, a sum of absolute difference (SAD) corresponding to each of the plurality of pixels, or brightness corresponding to each of the plurality of pixels.

15. The image sensor of claim 14, wherein the channel deviation determination processor is configured to determine the at least one channel deviation region by classifying a channel deviation region and a boundary region, based on the power per pixel frequency corresponding to each of the plurality of pixels and the pixel codes.

16. The image sensor of claim 12, wherein the plurality of pixels are configured to have a certain pattern, and the certain pattern includes at least one of a tetra pattern, a nono pattern, a tetra square (tetra^2) pattern, or a Q-cell pattern.

17. An operating method of an image sensor including a plurality of pixels, the operating method comprising:

generating first image data including pixel information, based on a plurality of pixel signals generated by the plurality of pixels;

determining whether the first image data is channel deviation image data in which a channel deviation has occurred, based on the pixel information;

calculating a determination parameter, based on the pixel information, in response to the first image data being the channel deviation image data determining at least one channel deviation region within the first image data, based on the determination parameter; and generating second image data by correcting the at least one channel deviation region, based on the determination parameter, the pixel information including pixel codes of the plurality of pixels.

18. The operating method of claim 17, wherein the determining of whether the first image data is the channel deviation image data, based on the pixel information, includes:

dividing the first image data into a plurality of regions;

calculating an average value of pixel codes included in each of the plurality of regions;

calculating a saturation ratio of the first image data by counting a number of regions having a value greater than or equal to a threshold pixel code among the calculated average values of the pixel codes; and determining, based on the saturation ratio, whether the first image data is the channel deviation image data.

19. The operating method of claim 17, wherein the determination parameter includes at least one of power per pixel frequency corresponding to each of the plurality of pixels, a sum of absolute difference (SAD) corresponding to each of the plurality of pixels, or brightness corresponding to each of the plurality of pixels.

20. The operating method of claim 19, wherein the generating of the second image data by correcting the at least one channel deviation region, based on the determination parameter, includes generating the second image data by performing correction on the at least one channel deviation region, based on power per pixel frequency corresponding to each of the pixels included in the at least one channel deviation region.

* * * * *